(12) United States Patent
Tanaka et al.

(10) Patent No.: US 7,145,448 B2
(45) Date of Patent: Dec. 5, 2006

(54) SEATBELT REMINDER SYSTEM

(75) Inventors: Masami Tanaka, Toyota (JP); Takashi Inoue, Okazaki (JP); Masashi Matsuda, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 277 days.

(21) Appl. No.: 10/927,000

(22) Filed: Aug. 27, 2004

(65) Prior Publication Data

US 2005/0045404 A1    Mar. 3, 2005

(30) Foreign Application Priority Data

Aug. 29, 2003  (JP)  ............................. 2003-307448

(51) Int. Cl.
*B60Q 1/00*    (2006.01)
(52) U.S. Cl. ............... 340/457.1; 340/457; 340/438; 340/667; 280/728.1; 280/801.1; 297/468; 297/482
(58) Field of Classification Search ............. 340/457.1, 340/457, 438, 439, 506, 521, 522, 691.1, 340/691.4, 692, 667, 461; 280/728.1, 734, 280/801.1; 701/36, 45, 1; 297/468, 482
See application file for complete search history.

(56) References Cited

U.S. PATENT DOCUMENTS

| | | | | |
|---|---|---|---|---|
| 4,825,385 A | * | 4/1989 | Dolph et al. ................. | 704/274 |
| 5,483,221 A | * | 1/1996 | Mutter et al. ............. | 340/457.1 |
| 6,362,734 B1 | * | 3/2002 | McQuade et al. ........ | 340/457.1 |
| 6,501,374 B1 | * | 12/2002 | King et al. ............... | 340/457.1 |
| 7,005,976 B1 | * | 2/2006 | Hagenbuch .............. | 340/457.1 |

FOREIGN PATENT DOCUMENTS

| | | |
|---|---|---|
| DE | 10203139 A1 | 8/2002 |
| JP | 63-141853 A | 6/1988 |
| JP | 5-85491 A | 4/1993 |
| JP | 3207595 B2 | 7/2001 |
| JP | 2004-231118 A | 8/2004 |

* cited by examiner

*Primary Examiner*—Daniel Wu
*Assistant Examiner*—Daniel Previl
(74) *Attorney, Agent, or Firm*—Birch, Stewart, Kolasch & Birch, LLP (57) ABSTRACT

A seatbelt reminder system for outputting a reminder for an occupant when the occupant leaves a seatbelt unfastened. The system includes a driver's seat reminder instruction section for outputting a reminder according to a first pattern (S405), a front passenger seat-rear passenger seat reminder instruction section for outputting a reminder according to a second pattern, and a second reminder synchronization section for synchronizing the reminders according to the first and second patterns with each other (S406) when the output of the reminder according to the second pattern is to be started while the reminder according to the first pattern is being output.

14 Claims, 7 Drawing Sheets

SEATBELT REMINDER SYSTEM

CROSS-REFERENCE TO A RELATED APPLICATION

This non-provisional application claims priority under 35 U.S.C. §119(a) on Japanese Patent Application No. 2003-307448, filed Aug. 29, 2003, the entire contents of which are incorporated herein by reference.

BACKGROUND OF THE INVENTION

1. Field of the Invention

The present invention relates to a seatbelt reminder system, and more particularly, to a seatbelt reminder system for outputting reminders in a manner associated with respective seats of a motor vehicle.

2. Description of the Related Art

Seatbelts equipped in a motor vehicle generally have the function of holding occupants in their seats when fastened. Thus, in order to prevent the seatbelts from being left unfastened, seatbelt reminder systems are used.

Such systems use, for example, a visible reminder produced by lighting a lamp or an audible reminder produced by sounding a buzzer, to notify occupants of a vehicle that a seatbelt is in an unfastened state.

In such systems, if the reminder is output with respect to each seat, a problem arises in that the driver feels unpleasant in cases where the seatbelts associated with the other seats than the driver's seat are unfastened, for example. A technique of solving the problem has been proposed (Japanese Patent No. 3207595).

The system disclosed in the patent is adapted to output different reminders for different seats, thereby to restrain the occupants from feeling unpleasant.

According to the conventional technique employed in the patent, the reminder for the driver's seat and the reminder for the other seats are output independently. With this technique, however, in cases where the seatbelts of the other seats than the driver's seat are unfastened, for example, where the seatbelts of the rear seats are left unfastened as is often the case, the reminder will still make the occupants feel unpleasant.

Namely, if the reminder for the driver's seat and the reminder for the other seats are output at different times and if the seatbelts of the driver's seat and other seats are left unfastened, the ON patterns of the reminders may overlap in part or in their entirety, with the result that the occupants are annoyed much by the reminders. Further, in such cases, it is difficult to have the occupants notice that the seatbelts are unfastened.

SUMMARY OF THE INVENTION

The present invention was made in view of the above circumstances, and an object thereof is to provide a seatbelt reminder system capable of mitigating occupants' annoyance caused by a reminder.

To achieve the object, the present invention provides a seatbelt reminder system for outputting a reminder for an occupant when the occupant leaves a seatbelt unfastened. A seatbelt reminder system according to the present invention comprises: a first detection element for detecting a fastened state of a seatbelt associated with a primary occupant's seat; a primary occupant's seat reminder element for outputting a reminder according to a predetermined first pattern when an unfastened state of the seatbelt of the primary occupant's seat is detected by the first detection element; a second detection element for detecting a fastened state of a seatbelt associated with a secondary occupant's seat; a secondary occupant's seat reminder element for outputting a reminder according to a predetermined second pattern when an unfastened state of the seatbelt of the secondary occupant's seat is detected by the second detection element; and a synchronization element operative when the output of the reminder according to the second pattern is to be started by the secondary occupant's seat reminder element while the reminder according to the first pattern is being output by the primary occupant's seat reminder element, to synchronize the reminder according to the first pattern and the reminder according to the second pattern with each other.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE PREFERRED EMBODIMENTS

Embodiments of the present invention will be hereinafter described with reference to the drawings.

Figure 1:
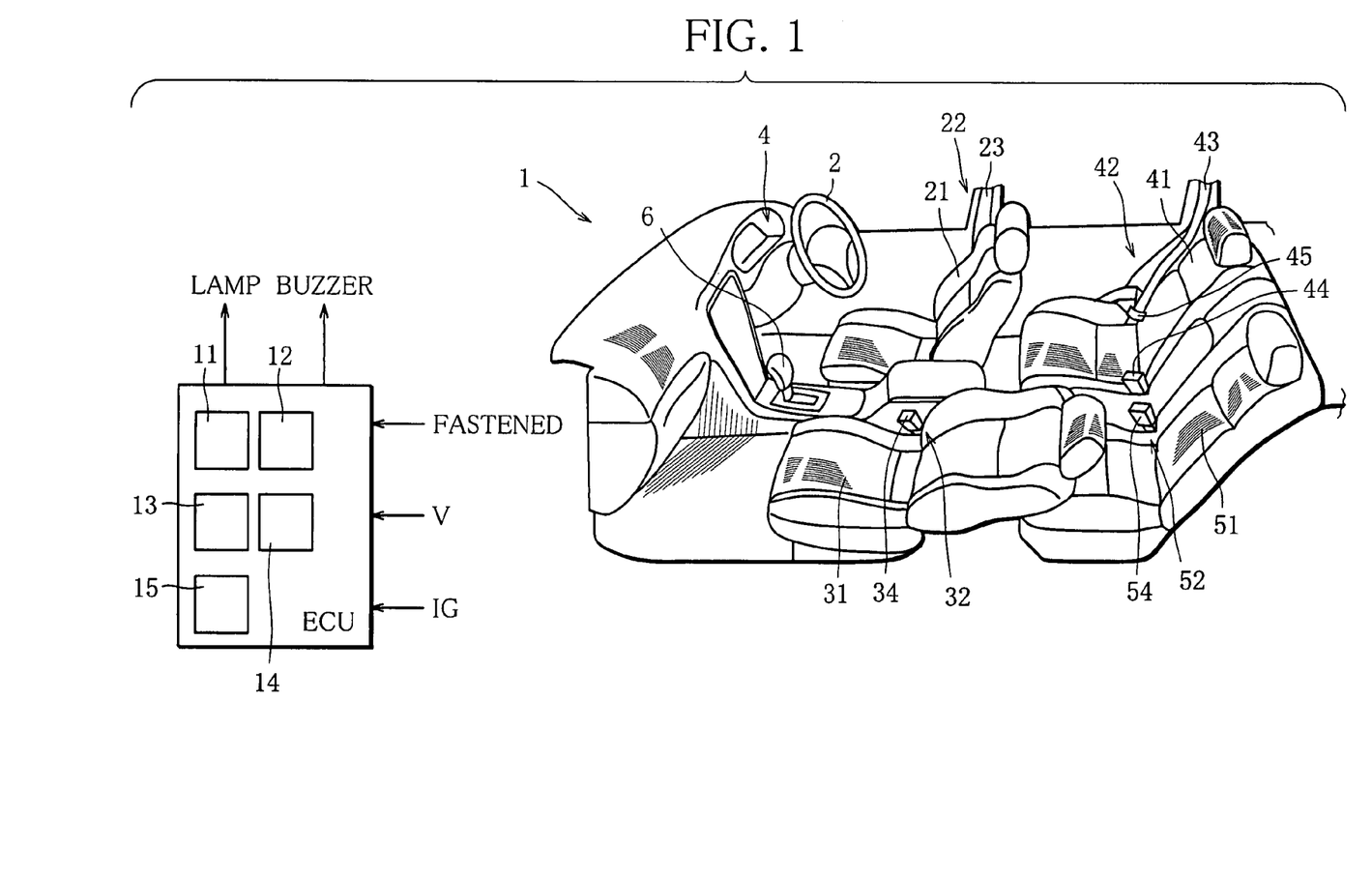
FIG. 1 is a view showing an interior of a vehicle to which a seatbelt reminder system according to a first embodiment of the present invention is applied.

FIG. 1 shows an interior of a motor vehicle to which is applied a seatbelt reminder system according to one embodiment of the present invention.

The vehicle 1 is a four-seater vehicle. Namely, the vehicle 1 has four occupants' seats, that is, a driver's seat 21, a front passenger seat 31, a right rear passenger seat 41, and a left rear passenger seat 51. In front of the driver's seat 21, a steering wheel 2, a display panel 4 and an ignition switch (IG1), not shown, are arranged at respective suitable locations. The steering wheel 2 is manipulated to change the direction of travel of the vehicle 1, and the display panel 4 shows various states of the vehicle 1. IG1 is switched ON and OFF to start and stop operation of the engine of the vehicle. A shift lever 6 is arranged at a suitable location between the driver's seat 21 and the front passenger seat 31 and is used to change the shift position.

The driver's seat 21, the front passenger seat 31, and the right and left rear passenger seats 41 and 51 are provided with seatbelts 22, 32, 42 and 52, respectively. When fastened, the seatbelts hold the bodies of occupants in their respective seats.

The seatbelts 22, 32, 42 and 52 used in this embodiment are each a three-point lap and diagonal seatbelt which is adapted to hold the waist and upper part of the occupant's body. The seatbelts 22, 32, 42 and 52 are constituted by identical parts; that is, each seatbelt comprises webbing, a buckle, a latch plate, a fixture, and a webbing retractor. The webbing is a single continuous belt serving both as waist webbing and shoulder webbing. The buckle is detachably connected with the latch plate through which the webbing is passed and by means of which the length of the webbing is adjusted. Each seatbelt is attached to the vehicle by the fixture.

In FIG. 1 are shown some of the parts of the seatbelts, which include webbing 23 for the occupant in the driver's seat 21, a buckle 34 for the occupant in the front passenger seat 31, webbing 43, a buckle 44 and a latch plate 45 for the occupant in the right rear passenger seat 41, and a buckle 54 for the occupant in the left rear passenger seat 51.

Each seatbelt is worn with the latch plate coupled to the buckle, and the fastened/unfastened state of each seatbelt is input to an electronic control unit (ECU) 10. The ECU 10 is also supplied with various other signals such as a signal indicative of the vehicle speed of the vehicle 1.

In the seatbelt reminder system of this embodiment, the ECU 10 includes a first detection section (first detection element) 11, a second detection section (second detection element) 12, a driver's seat reminder instruction section (primary occupant's seat reminder element) 13, front passenger seat-rear passenger seat reminder instruction section (secondary occupant's seat reminder element) 14, and a second reminder synchronization section (synchronization element) 15.

The first detection section 11 detects the fastened/unfastened state of the seatbelt 22 of the driver's seat 21 through electrical conversion of a signal indicative of the coupled/uncoupled state of the buckle and latch plate of the seatbelt 22, and outputs the detection result to the driver's seat reminder instruction section 13. Specifically, a seatbelt switch $BELT_{SW1}$ associated with the seatbelt 22 switches OFF when the seatbelt 22 is fastened, and switches ON when the seatbelt 22 is unfastened. The detection section 11 also detects the speed of the vehicle 1 through electrical conversion of a signal supplied from a vehicle speed sensor, not shown. For example, when the vehicle speed V is within the range of 0 km/h (0 mph) to $V_S$ (about 3 km/h (about 2 mph)), the vehicle 1 is judged to be in a stopped state, and when the vehicle speed V is higher than $V_M$ (about 8 km/h (about 5 mph)), the vehicle 1 is judged to be in a running state. These states are output to the reminder instruction section 13.

The second detection section 12 detects the fastened/unfastened states of the seatbelts of the other seats than the driver's seat 21, that is, the front passenger seat 31 and the right and left rear passenger seats 41 and 51, through electrical conversion of signals indicative of the coupled/uncoupled states of the buckles and latch plates of the respective seatbelts 32, 42 and 52, and outputs the detection results to the front passenger seat-rear passenger seat reminder instruction section 14. Also, the detection section 12 detects the speed of the vehicle 1 and outputs the detection result to the reminder instruction section 14.

In accordance with the detection results obtained by the detection sections 11 and 12, the reminder instruction sections 13 and 14 output driving signals to a visual warning device and an auditory warning device to notify the occupants of the unfastened states of the seatbelts by lighting a lamp and sounding a buzzer, respectively, thereby preventing the seatbelts from being left unfastened. In this embodiment, the occupants are reminded of the unfastened seatbelts by means of a common lamp and buzzer.

Figure 2:
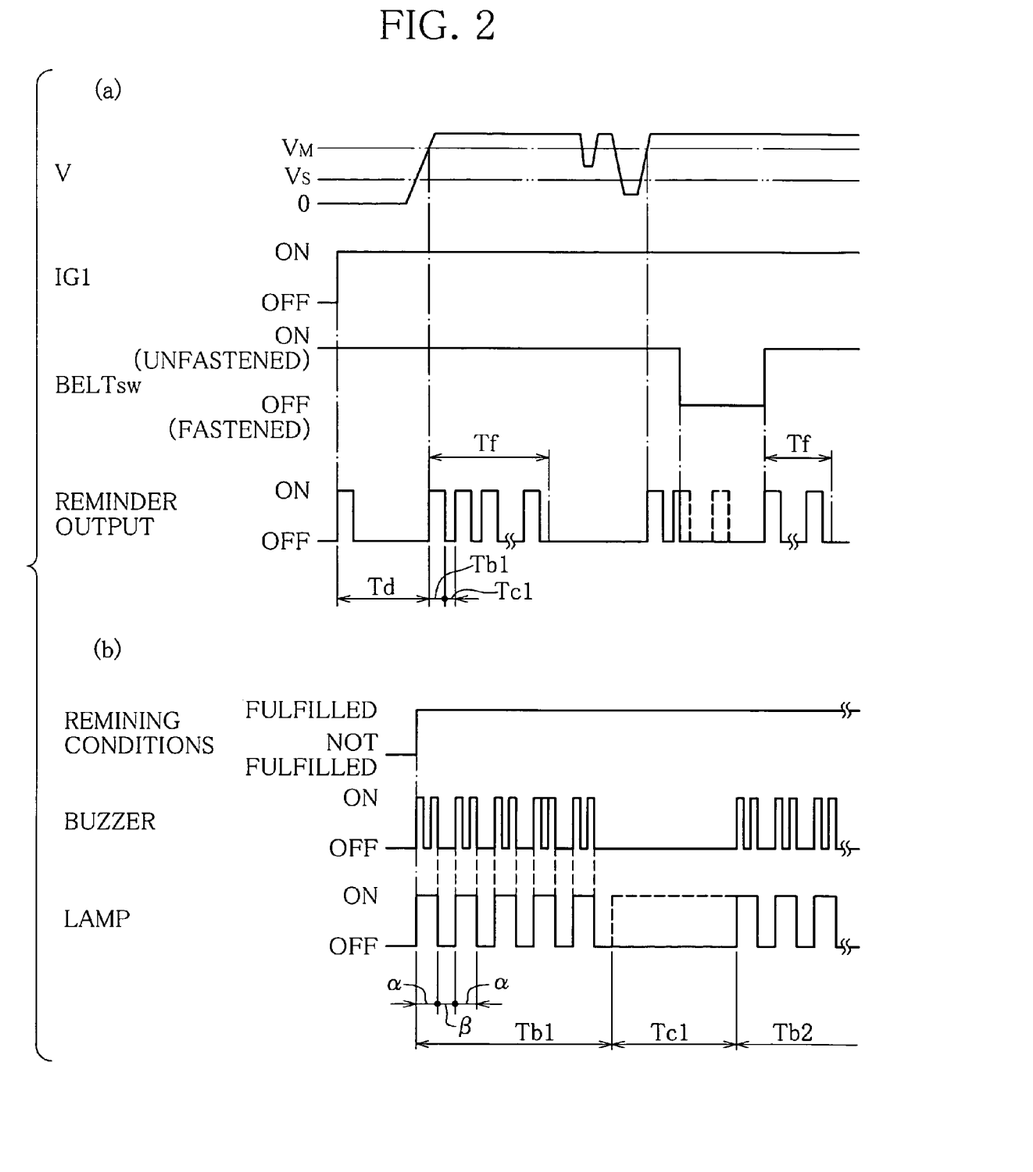
FIG. 2 is a timing chart illustrating reminder control performed by the seatbelt reminder system of FIG. 1.

Specifically, first, a first reminder is output by lighting the lamp for about 60 seconds and sounding the buzzer for about six second. FIG. 2(*a*) shows a timing chart illustrating reminder control. As shown in the figure, if $BELT_{SW}$ is ON when IG1 is turned ON, the buzzer is sounded for about 6 seconds as the first reminder. Although FIG. 2(*a*) shows only the output of the reminder by means of the buzzer, the lamp is also lighted for about 60 seconds. After a lapse of a first reminding period Td of about 60 seconds, the output of the first reminder is ended.

After the output of the first reminder is ended, the driver's seat reminder instruction section 13 outputs driving signals for lighting the lamp and sounding the buzzer in accordance with the detection results from the detection section 11, to notify the driver of the unfastened state of the seatbelt 22 of the driver's seat 21 so that the seatbelt 22 may be prevented from being left unfastened. This reminder, or a second reminder, is output according to a first pattern consisting of ON and OFF times.

Specifically, the second reminder is output according to the first pattern after the first reminder is output for the period Td and at the same time if IG1 is ON, $BELT_{SW}$ is ON and the vehicle speed V is higher than $V_M$, as seen from FIG. 2(*a*). The first pattern consists of an ON time Tb1, Tb2, ... (A seconds each), during which the buzzer is intermittently sounded, and an OFF time Tc1, Tc2, ... (B (<A) seconds each), during which the buzzer is stopped, and the second reminder is output according to the first pattern over a predetermined period Tf (the first pattern is repeated N times). Also, the lamp is switched ON and OFF according to the first pattern consisting of the ON time Tb1, Tb2, ... (A seconds each), during which the lamp is intermittently lighted, and the OFF time Tc1, Tc2, ... (B seconds each), during which the lamp is kept unlit. The pair of ON and OFF times is repeated N times.

The lamp is intermittently lighted during each of the ON times Tb1, Tb2, ... according to the pattern shown in FIG. 2(*b*), which shows the pattern of FIG. 2(*a*) on an enlarged scale. As shown in the figure, a rectangular wave-like set pattern consisting of α seconds of ON time and β (>α) seconds of OFF time is repeated C times. On the other hand, the buzzer is intermittently sounded during each of the ON times Tb1, Tb2, ... according to the pattern shown in FIG. 2(*b*). Specifically, a rectangular wave-like set pattern consisting of α/3 seconds of ON time, α/3 seconds of OFF time, α/3 seconds of ON time and β seconds of OFF time is repeated C times. Namely, each set pattern is configured such that while the lamp remains ON for α seconds, the buzzer is switched ON and OFF and ON at intervals of α/3 seconds and that both the lamp and the buzzer are switched OFF thereafter for β seconds.

The front passenger seat-rear passenger seat reminder instruction section 14 also outputs driving signals for lighting lamps and sounding buzzers, as the second reminder, in accordance with the detection results from the detection section 12, to notify the occupants of the unfastened states of the seatbelts 32, 42 and 52 of the front passenger seat 31 and the right and left rear passenger seats 41 and 51 so that the seatbelts 32, 42 and 52 may be prevented from being left unfastened. This second reminder is also output according to a second pattern consisting of ON and OFF times, as shown in FIG. 2.

Both the reminder instruction sections 13 and 14 can again output the reminder as needed when the stopped state of the vehicle 1 is detected after the output of the second reminder is ended. Also, if, after the stopped state of the vehicle is detected following the termination of the second reminder, the ON state of IG1, the unfastened state of any seatbelt and the running state of the vehicle 1 are detected, the reminder is again output.

In the case where the output of the reminder according to the second pattern is started by the front passenger seat-rear passenger seat reminder instruction section 14 while the reminder is output according to the first pattern by the driver's seat reminder instruction section 13, the second reminder synchronization section 15 synchronizes the reminders according to the first and second patterns with each other.

Figure 3:
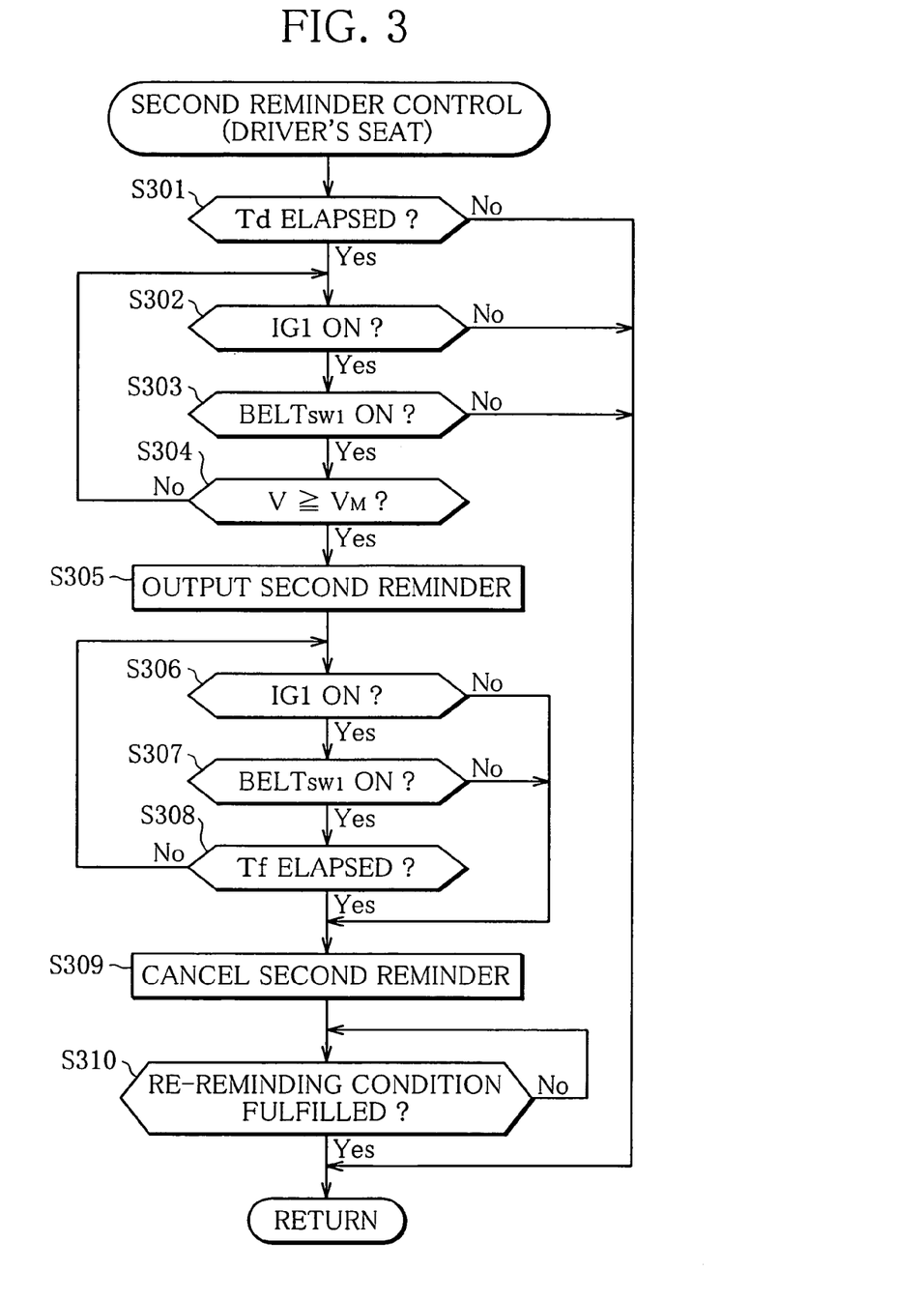
FIG. 3 is a flowchart illustrating second reminder control for a primary occupant's seat, performed by the seatbelt reminder system of FIG. 1.

Referring now to FIG. 3, there is shown a flowchart of second reminder control performed by the seatbelt reminder system of the present invention with respect to the driver's seat 21 as a primary occupant's seat. In the following, operation of the seatbelt reminder system configured as described above will be explained.

In Step S301 in FIG. 3, it is determined whether or not the reminding period Td for the first reminder has elapsed. If it is judged that about 60 seconds have elapsed after IG1 is turned ON, the flow proceeds to Step S302.

It is determined in Step S302 whether or not IG1 is ON. If the engine is operating, that is, if the decision in Step S302 is YES, the flow proceeds to Step S303 to determine whether or not $BELT_{SW1}$ detected by the detection section 11 is ON. If the seatbelt 22 is in the unfastened state, that is, if the decision in Step S303 is YES, the flow proceeds to Step S304.

Figure 5:
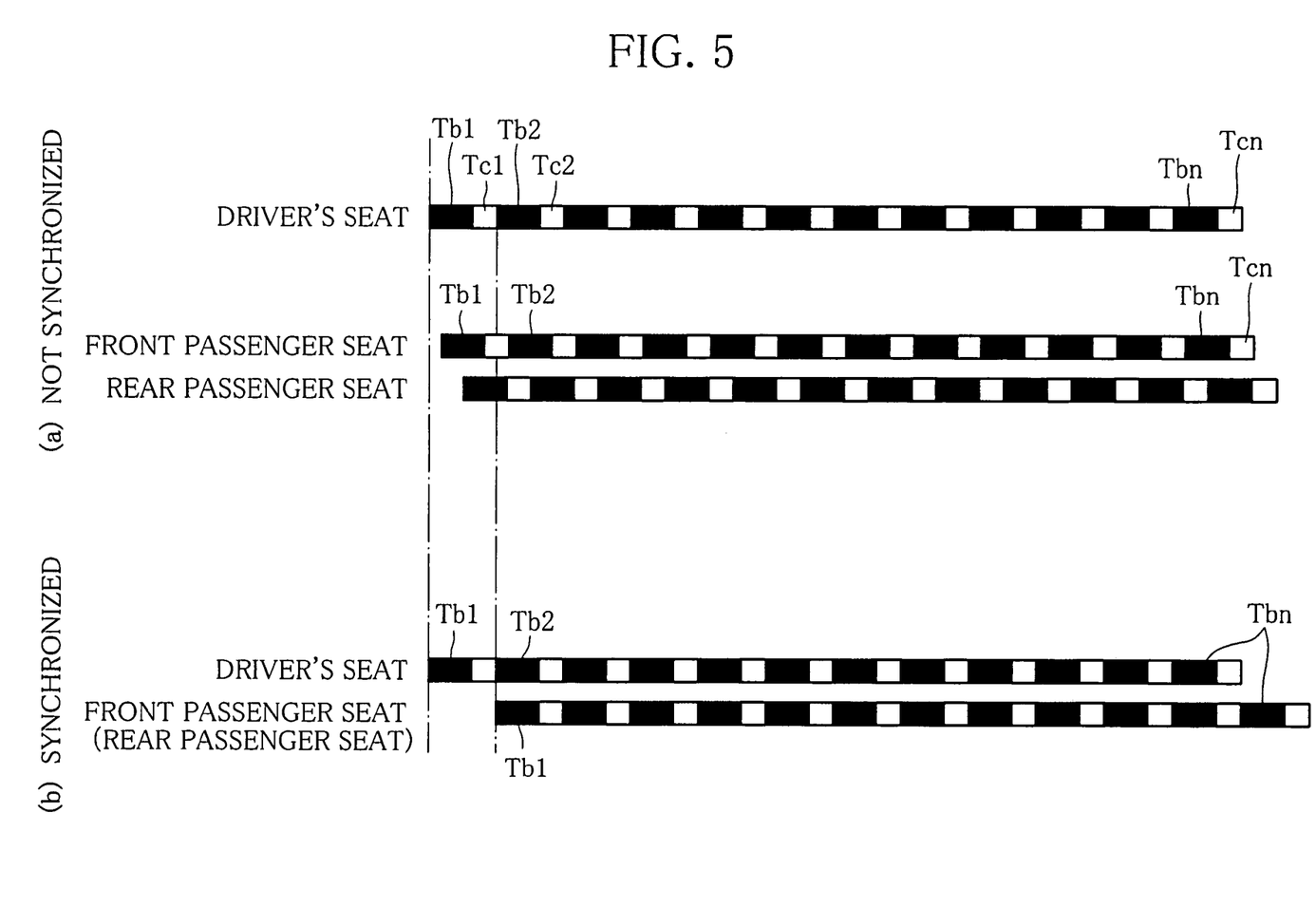
FIG. 5 is a timing chart illustrating the second reminder control performed by the seatbelt reminder system of FIG. 1.

In Step S304, it is determined whether or not the vehicle speed V detected by the detection section 11 is higher than $V_M$. If the vehicle speed V is higher than $V_M$, that is, if the decision in Step S304 is YES, the flow proceeds to Step S305 in which the reminder instruction section 13 outputs the second reminder driving signals for the driver's seat 21, so that the second reminder is output for the period Tf during which the pair of A-second ON time and B-second OFF time is repeated N times. Namely, as long as the seatbelt 22 remains unfastened, the pair consisting of the ON time Tb, in which the buzzer is intermittently sounded, and the OFF time Tc is repeated N times from the first pair of Tb1 and Tc1 through to the Nth pair of Tbn and Tcn, as shown in FIG. 5. Also, the pair of the ON and OFF times for switching ON and OFF the lamp is repeated N times.

When it is judged in Step S306 that IG1 is turned OFF or it is judged in Step S307 that $BELT_{SW1}$ is switched OFF, the output of the second reminder is immediately stopped, whereupon the flow proceeds to Step S309. The flow proceeds to Step S309 also when it is judged in Step S308 that the period Tf has elapsed, that is, the aforementioned pair has been repeated up to the Nth pair of Tbn and Tcn. In Step S309, the second reminder is canceled to terminate the output thereof, and the flow then proceeds to Step S310.

In Step S310, the reminder instruction section 13 determines whether or not a re-reminding condition is fulfilled. If the vehicle speed V has become lower than or equal to $V_S$, that is, if the decision in Step S310 is YES, the routine is ended.

The routine is ended also when it is judged in Step S301 that the first reminding period Td has not elapsed yet, when it is judged in Step S302 that IG1 is OFF, or when it is judged in Step S303 that $BELT_{SW1}$ is OFF. When it is judged in Step S304 that the vehicle speed V is lower than $V_M$, the flow returns to Step S302.

Figure 4:
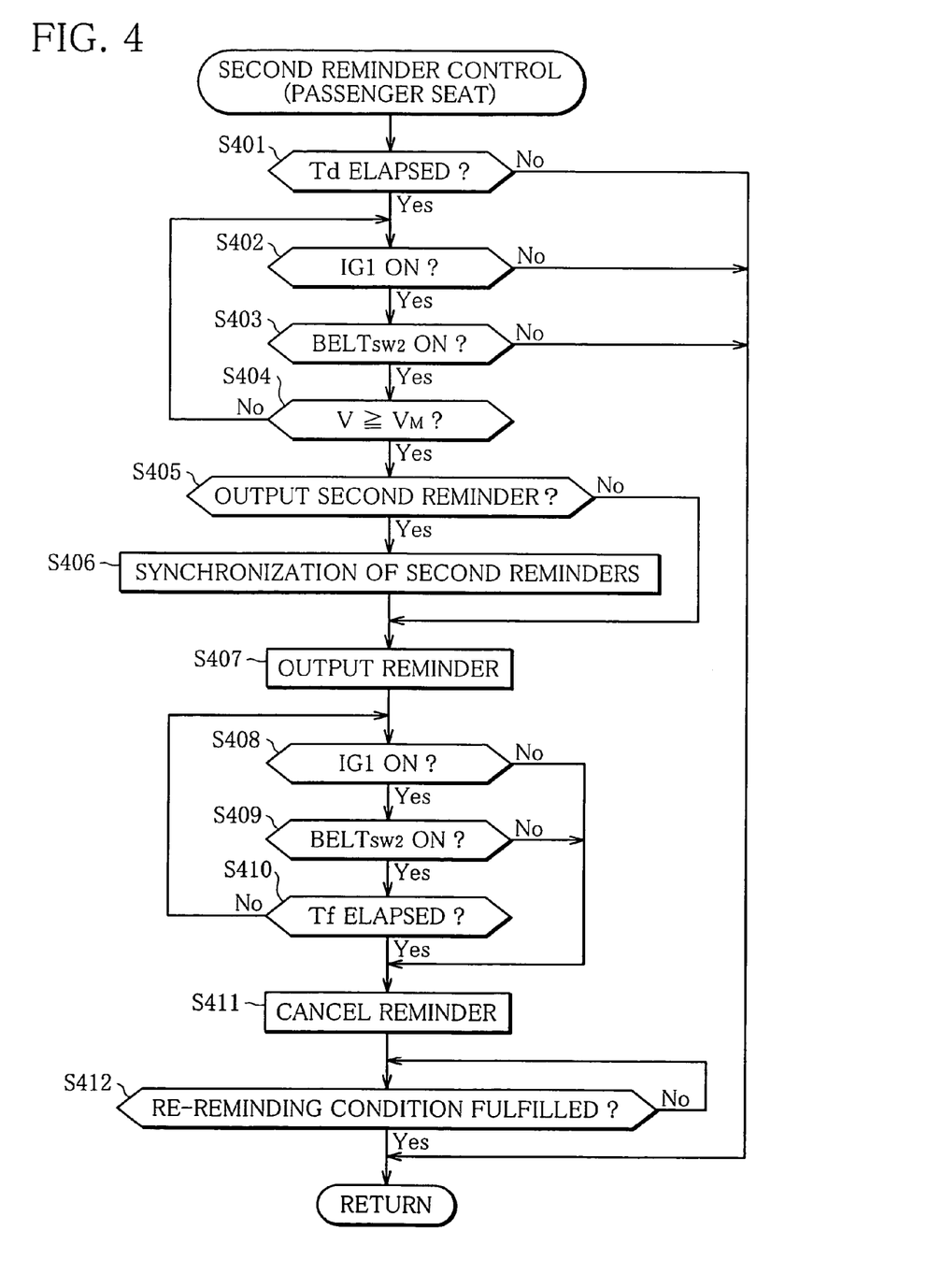
FIG. 4 is a flowchart illustrating second reminder control for secondary occupants' seats, performed by the seatbelt reminder system of FIG. 1.

FIG. 4 is a flowchart illustrating second reminder control performed by the seatbelt reminder system with respect to the other passenger seats as secondary occupants' seats.

In Step S401, it is determined whether or not the reminding period Td for the first reminder has elapsed. If it is judged that the first reminding period Td has elapsed, that is, if it is judged that about 60 seconds have elapsed after IG1 is turned ON, the flow proceeds to Step S402.

It is determined in Step S402 whether or not IG1 is ON. If the engine is operating, that is, if the decision in Step S402 is YES, the flow proceeds to Step S403 to determine whether or not $BELT_{SW2}$ detected by the second detection section 12 is ON. If any of the seatbelts 32, 42 and 52 is in the unfastened state, that is, if the decision in Step S403 is YES, the flow proceeds to Step S404.

In Step S404, it is determined whether or not the vehicle speed V detected by the second detection section 12 is higher than $V_M$. If the vehicle speed V is higher than $V_M$, that is, if the decision in Step S404 is YES, the flow proceeds to Step S405.

It is determined in Step S405 whether or not the second reminder is being output with respect to the primary occupant's seat. If the second reminder is being output with respect to the driver's seat 21, that is, if the decision in Step S405 is YES, the flow proceeds to Step S406. The second reminder synchronization section 15 then controls the output of the second reminder for the front passenger seat 31 or the rear passenger seat 41 or 51 such that the start of an initial pattern thereof is synchronized with the start of a subsequent pattern of the ongoing second reminder for the driver's seat 21. Subsequently, the flow proceeds to Step S407. If, on the other hand, it is judged in Step S405 that the second reminder is not being output with respect to the driver's seat 21, the flow proceeds directly to Step S407.

In Step S407, the front passenger seat-rear passenger seat reminder instruction section 14 outputs the second reminder driving signals for the front passenger seat 31 or the rear passenger seat 41 or 51, so that the second reminder is output for the period Tf during which the pair of A-second ON time and B-second OFF time is repeated N times.

As shown in the timing chart of FIG. 5(a) illustrating asynchronous second reminder control, where the second reminder for the driver's seat and the second reminder for the other seats are output independently of each other, the OFF time Tc1 of the second reminder for the driver's seat possibly overlaps with the ON time Tb1 of the second reminder for the other seats, making the occupants annoyed by the reminders or making it difficult for the occupants to notice the second reminders indicative of the unfastened states of the seatbelts.

On the other hand, where the synchronization control is performed in Step S406, the initial pattern (Tb1) of the second reminder for the front passenger seat 31 or the rear passenger seat 41 or 51 is started in synchronism with the start of a subsequent pattern (Tb2) of the second reminder for the driver's seat 21, as shown in FIG. 5(b). Accordingly, the ON time Tb1 of the second reminder for the front passenger seat 31 or the rear passenger seat 41 or 51 never overlaps with the OFF time Tc1 of the second reminder for the driver's seat 21, thus lessening the occupants' annoyance caused by uninterrupted ON times of the reminders. Further, since the second reminders warning the unfastened states of the seatbelts 22, 32, 42 and 52 are output according to the same pattern, the occupants can be reminded forcibly of the unfastened states.

When it is judged in Step S408 that IG1 is turned OFF or it is judged in Step S409 that $BELT_{SW2}$ is switched OFF, the flow proceeds to Step S411 to immediately stop the output of the second reminder. The flow proceeds to Step S411 to terminate the second reminder also when it is judged in Step S410 that the period Tf has elapsed.

In Step S412, the reminder instruction section 14 determines whether or not the re-reminding condition is fulfilled. If the vehicle speed V has become lower than or equal to $V_S$, the routine is ended. The routine is ended also when it is judged in Step S401 that the first reminding period Td has not elapsed yet, when it is judged in Step S402 that IG1 is OFF, or when it is judged in Step S403 that $BELT_{SW2}$ is OFF. When it is judged in Step S404 that the vehicle speed V is lower than $V_M$, the flow returns to Step S402.

As described above, in this embodiment, the pattern of the second reminder for the passenger seats to be output anew is synchronized with the pattern of the second reminder for the driver's seat which is being output. In other words, the second reminder to be newly output is synchronized by being delayed for one block at most, whereby the occupants' annoyance caused by the reminders can be mitigated.

Further, the occupants are notified of the reminders output according to the same pattern, and this permits the occupants to readily notice that they are reminded of the unfastened states of the seatbelts.

Figure 6:
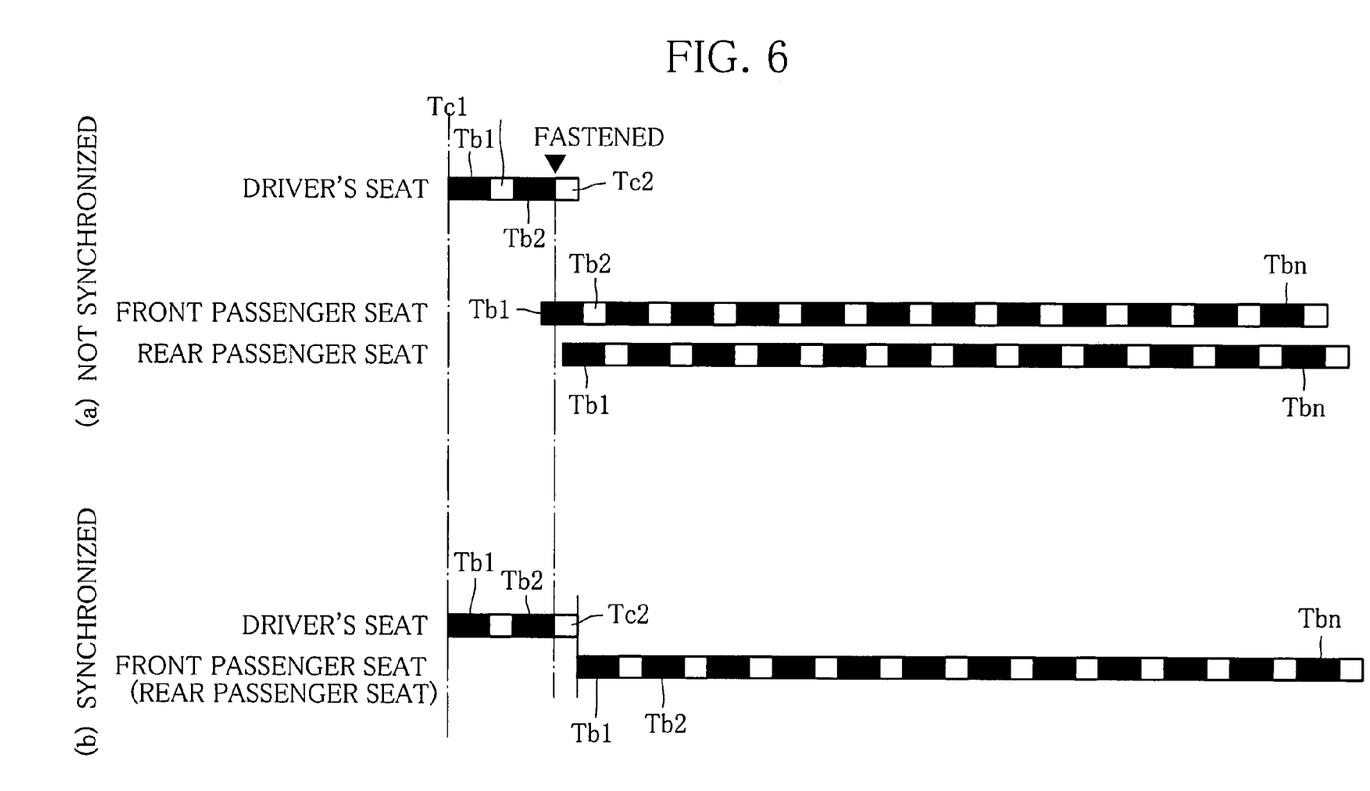
FIG. 6 is a timing chart illustrating another example of the second reminder control according to the present invention.

In the first embodiment described above, the second reminder pattern for the driver's seat 21 is repeated up to the Nth pair. If, however, the fastened state of the seatbelt 22 is detected in the middle of Tb2 by the first detection section 11, as shown in FIG. 6, the output of the second reminder for the driver's seat 21 is stopped thereafter. In such cases, the output of the second reminder for the passenger seat 31, 41 or 51 may be controlled by the second reminder synchronization section 15 such that the initial pattern (Tb1) thereof is started at the time of termination of the second reminder pattern (Tc2) for the driver's seat 21, as shown in FIG. 6(*b*). The initial pattern of the second reminder for the passenger seat is in this case started at timing synchronized with the second reminder pattern for the driver's seat 21, making it possible to prevent the occupants from feeling uncoordinated.

In the examples shown in FIGS. 5 and 6, the second reminding period for the passenger seats and the second reminding period for the driver's seat 21 end at different times, and this is because the same fixed period is set for the individual reminding periods. The second reminding period for the driver's seat 21 and the second reminding period for the other seats may alternatively be made to end simultaneously by prolonging the second reminding period for the driver's seat 21, for example.

With reference to the above embodiment, explanation is given of the case where, while the second reminder for the driver's seat 21 is output, the output of the second reminder for the other seats is started. Where the output of the second reminder for the driver's seat 21 is started while the second reminder for the other seats is output, the reminders may be synchronized in like manner. Namely, regardless of the seat, e.g., the driver's seat or the front passenger seat, with respect to which the second reminder is being output, the ongoing second reminder and the second reminder to be newly output may be suitably synchronized with each other.

Figure 7:
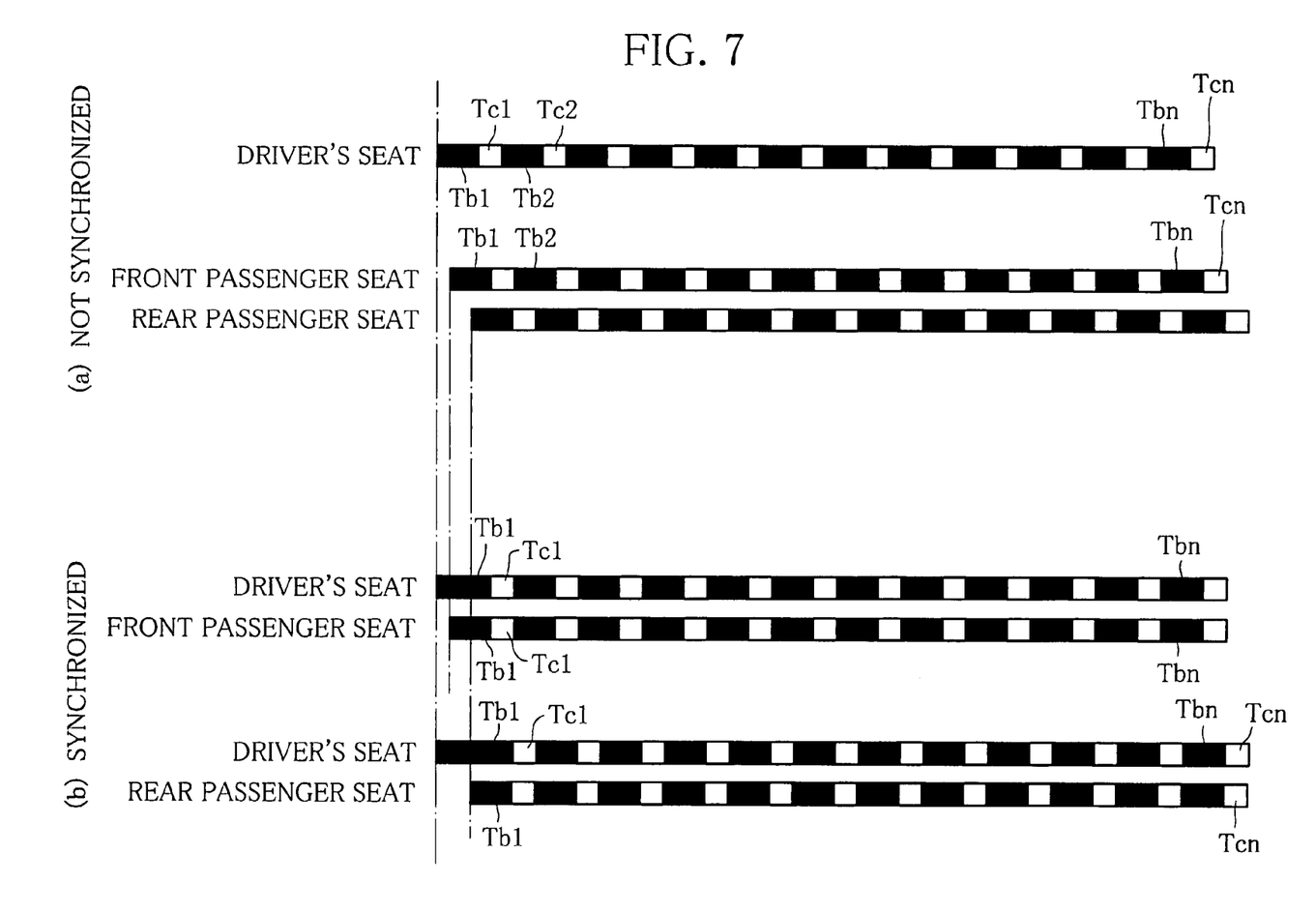
FIG. 7 is a timing chart illustrating second reminder control performed by a seatbelt reminder system according to a second embodiment of the present invention.

Also, unlike the foregoing embodiment in which the second reminder pattern to be newly output is synchronized with the second reminder pattern which is being output, the latter may be synchronized with the former. Specifically, as shown in FIG. 7, when the initial pattern (Tb1) of the second reminder for the front passenger seat 31 or the rear passenger seat 41 or 51 is started, a new pattern (Tb1) of the second reminder for the driver's seat 21 may be started anew. Namely, when the initial pattern of the second reminder for the front passenger sear 31 or the rear passenger seat 41 or 51 is started, the current pattern of the ongoing second reminder for the driver's seat 21 is discontinued and immediately restarted so as to be synchronized with the initial pattern of the subsequently started second reminder. The discontinued pattern is excluded from the predetermined number of times, so that the second reminder pattern is repeated the predetermined number of times without fail while at the same time mitigating the occupants' annoyance.

Also in this case, regardless of the seat, e.g., the driver's seat or the front passenger seat, the ongoing second reminder and the second reminder to be output anew may be appropriately synchronized with each other.

Further, the reminder for the driver's seat 21 and the reminders for the other seats 31, 41 and 51 may be output from respective different warning devices. In this case, the occupants can be reminded more distinguishably of the unfastened states of the respective seatbelts, and the reminders can be output in accordance with a variety of specifications.

Also, the second reminder for the driver's seat 21 and the second reminders for the other seats 31, 41 and 51 may be output according to a variety of patterns. Where the patterns of the second reminders are the same, for example, the second reminders can be synchronized optimally.

Furthermore, in the foregoing embodiments, the relation between the reminder for the driver's seat 21 and the reminder for the front passenger seat 31 or the rear passenger seat 41 or 51 is explained. The combination of seats is not limited to this alone, and the present invention can be used for any desired combination of seats.

Also, in the first embodiment, the re-reminding condition is fulfilled when the stopped state of the vehicle 1 is detected. Alternatively, the re-reminding condition may be judged to be satisfied when change from the unfastened state to fastened state of the seatbelt is detected. Further, the re-reminding condition may be made selectable by the user. Also, the seatbelts to be used are not limited to three-point seatbelts, and two-point seatbelts for holding only the occupant's waist, for example, may be used instead. Further, a webbing device comprising waist webbing and shoulder webbing separate from each other may be used for certain seats depending on their location.

In the foregoing embodiments, the A-second lamp ON time and the B-second lamp OFF time are each repeated N times as the second reminder. The ON and OFF times and the number of repetitions may be set as desired while maintaining the warning capability.

The invention claimed is:

1. A seatbelt reminder system for outputting a reminder for an occupant when the occupant leaves a seatbelt unfastened, comprising:
    a first detection element for detecting a fastened state of a seatbelt associated with a primary occupant's seat;
    a primary occupant's seat reminder element for outputting a reminder according to a predetermined first pattern when an unfastened state of the seatbelt of the primary occupant's seat is detected by said first detection element;

a second detection element for detecting a fastened state of a seatbelt associated with a secondary occupant's seat;

a secondary occupant's seat reminder element for outputting a reminder according to a predetermined second pattern when an unfastened state of the seatbelt of the secondary occupant's seat is detected by said second detection element; and a synchronization element operative when the output of the reminder according to the second pattern is to be started by said secondary occupant's seat reminder element while the reminder according to the first pattern is being output by said primary occupant's seat reminder element, to synchronize the reminder according to the first pattern and the reminder according to the second pattern with each other.

2. The seatbelt reminder system according to claim 1, wherein said synchronization element starts an initial pattern of the reminder according to the second pattern when a subsequent pattern of the reminder according to the first pattern is started.

3. The seatbelt reminder system according to claim 1, wherein said primary occupant's seat reminder element stops the output of the reminder according to the first pattern when the fastened state of the seatbelt is detected by said first detection element while a predetermined pattern of the reminder according to the first pattern is being output, and said synchronization element is operative when a condition for outputting the reminder according to the second pattern is fulfilled during a period for outputting the predetermined pattern of the reminder according to the first pattern, to start an initial pattern of the reminder according to the second pattern when the period for outputting the predetermined pattern ends.

4. The seatbelt reminder system according to claim 1, wherein said synchronization element starts a new pattern of the reminder according to the first pattern when an initial pattern of the reminder according to the second pattern is started.

5. The seatbelt reminder system according to claim 4, wherein said primary occupant's seat reminder element repeats the first pattern of the reminder a predetermined number of times, and when the initial pattern of the reminder according to the second pattern is started by said synchronization element while a predetermined pattern of the reminder according to the first pattern is being output, the predetermined pattern is excluded from the predetermined number of times.

6. The seatbelt reminder system according to claim 1, wherein said primary occupant's seat reminder element and said secondary occupant's seat reminder element cause a common warning device to output the reminders.

7. The seatbelt reminder system according to claim 6, wherein said warning device outputs at least one of an audible warning and a visible warning.

8. The seatbelt reminder system according to claim 1, wherein said primary occupant's seat reminder element and said secondary occupant's seat reminder element cause respective different warning devices to output the respective reminders.

9. The seatbelt reminder system according to claim 8, wherein said warning device outputs at least one of an audible warning and a visible warning.

10. The seatbelt reminder system according to claim 1, wherein said reminder according to the first pattern and said reminder according to the second pattern have an identical period.

11. A seatbelt reminder method for outputting a reminder for an occupant when the occupant leaves a seatbelt unfastened, comprising the steps of:

outputting a reminder according to a predetermined first pattern when a seatbelt associated with a primary occupant's seat is unfastened;

outputting a reminder according to a predetermined second pattern when a seatbelt associated with a secondary occupant's seat is unfastened; and synchronizing the reminder according to the first pattern and the reminder according to the second pattern with each other when the output of the reminder according to the second pattern is to be started while the reminder according to the first pattern is being output.

12. The seatbelt reminder method according to claim 11, wherein the reminder according to the first pattern and the reminder according to the second pattern are synchronized by starting an initial pattern of the reminder according to the second pattern when a subsequent pattern of the reminder according to the first pattern is started.

13. The seatbelt reminder method according to claim 11, wherein the reminder according to the first pattern and the reminder according to the second pattern are synchronized by starting a new pattern of the reminder according to the first pattern when an initial pattern of the reminder according to the second pattern is started.

14. The seatbelt reminder method according to claim 11, wherein the reminder according to the first pattern and the reminder according to the second pattern have an identical period.

* * * * *